(12) United States Patent
Wolfgang et al.

(10) Patent No.: US 8,140,232 B2
(45) Date of Patent: Mar. 20, 2012

(54) METHOD FOR CONTROLLING AND/OR REGULATING AN AUTOMATIC GEARBOX

(75) Inventors: Werner Wolfgang, Ravensburg (DE); Maik Wurthner, Friedrichshafen (DE); Ingo Sauter, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 452 days.

(21) Appl. No.: 12/446,037

(22) PCT Filed: Oct. 11, 2007

(86) PCT No.: PCT/EP2007/060806
§ 371 (c)(1),
(2), (4) Date: Apr. 17, 2009

(87) PCT Pub. No.: WO2008/049734
PCT Pub. Date: May 2, 2008

(65) Prior Publication Data
US 2010/0042300 A1 Feb. 18, 2010

(30) Foreign Application Priority Data
Oct. 24, 2006 (DE) .......................... 10 2006 049 995

(51) Int. Cl.
*G06F 19/00* (2011.01)
(52) U.S. Cl. ........................................................ 701/58
(58) Field of Classification Search .................... 701/58, 701/54, 66, 70, 93, 94; 180/65.3, 170, 176
See application file for complete search history.

(56) References Cited

U.S. PATENT DOCUMENTS

| | | | |
|---|---|---|---|
| 4,597,465 A * | 7/1986 | Burney | 180/176 |
| 4,913,006 A | 4/1990 | Tsuyama et al. | |
| 4,956,778 A * | 9/1990 | Naito | 701/93 |
| 5,197,563 A * | 3/1993 | Sakonju et al. | 180/176 |
| 5,540,632 A | 7/1996 | Lardy et al. | |
| 5,778,331 A * | 7/1998 | Leising et al. | 701/66 |
| 6,216,068 B1 | 4/2001 | Gimmler et al. | |
| 6,306,056 B1 * | 10/2001 | Moore | 475/5 |
| 6,311,116 B1 * | 10/2001 | Lee | 701/70 |
| 6,428,448 B2 | 8/2002 | Saito et al. | |
| 6,459,981 B1 | 10/2002 | Gimmler et al. | |
| 6,547,697 B1 * | 4/2003 | Taffin et al. | 477/109 |
| 7,413,526 B2 * | 8/2008 | Kitamura et al. | 477/121 |
| 2008/0228363 A1 * | 9/2008 | Kouno et al. | 701/54 |

FOREIGN PATENT DOCUMENTS

| | | |
|---|---|---|
| DE | 44 11 940 A1 | 10/1995 |
| DE | 197 48 424 A1 | 5/1999 |
| DE | 199 24 945 A1 | 12/2000 |
| DE | 100 65 368 A1 | 9/2001 |
| DE | 10 2004 030 198 A1 | 2/2006 |
| EP | 1 033 276 A2 | 9/2000 |
| EP | 1 557 590 A1 | 7/2005 |
| EP | DE102004030198 * | 2/2006 |

* cited by examiner

*Primary Examiner* — Thomas Black
*Assistant Examiner* — Marthe Marc-Coleman
(74) *Attorney, Agent, or Firm* — Davis & Bujold, P.L.L.C.

(57) ABSTRACT

A process of controlling and/or regulating an automatic transmission in which a predetermined shifting speed of the gear shift is carried out and adjusted during a shift program, and in which the detection of a constant-speed driving of the vehicle is carried out at least during the shift program.

14 Claims, 2 Drawing Sheets

METHOD FOR CONTROLLING AND/OR REGULATING AN AUTOMATIC GEARBOX

This application is a National Stage completion of PCT/EP2007/060806 filed Oct. 11, 2007, which claims priority from German patent application serial no. 10 2006 049 995.6 filed Oct. 24, 2006.

FIELD OF THE INVENTION

The invention concerns a process for control and/or regulation of an automatic transmission.

BACKGROUND OF THE INVENTION

Processes for the control and/or regulation of an automatic transmission in which a shifting procedure is carried out with automatic shift programs in multispeed transmissions are known from automotive technology. The shift program determines a shifting speed based on different input signals which must be reached in the normal case within a defined period of time, in order to carry out the gear shift.

This creates the basic problem that an unexpected transition of the engine speed into speed regulation during normal driving operation can occur. An engine speed regulation can take place externally, for example, by means of a target speed predetermined by the driver or by means of a predetermined maximum speed. An internal engine speed regulation can also occur which takes place, for example, when the maximum performance of the engine or the maximum speed has been reached. Due to the engine speed regulation, it is not possible to reach the shifting speed determined by the shift program in order to carry out the desired gear shift.

From the publication EP 1 033 276 B1, for example, a process and a device for automatically influencing the driving behavior of a motor vehicle with an internal combustion engine are known. With the known process it is essentially possible to take corresponding measures for improved strategies related to economy and safety at the start or at the end of a driving situation. It is thus also possible to carry out further braking measures by activating the engine brake, in order to support the braking procedure after a detected start of a delay procedure. Specific driving conditions are thus adapted by means of the known process. It is also not possible to solve the problems related to an unexpected transition into engine speed regulation during a shifting procedure by means of the known process.

Known from the publication DE 197 48 424 C2 is another process for adaptive control of the driving conditions of a variable adjustable vehicle assembly. An adaptive control is also in the foreground in this process. A specific wish of the driver can be realized with this process on the basis of an improved set of characteristics. The long-term driving behavior, that is, the driving mode of the respective vehicle driver, can be taken into consideration in this way.

SUMMARY OF THE INVENTION

Based on the mentioned state of the art, it is the object of the invention to propose a process of the kind described above in which engine control intervention is detected and taken into consideration.

A process for control and/or regulation of an automatic transmission is accordingly proposed with which the detection of constant-speed driving can be carried out on the vehicle at least during the shift program.

In this manner, an unexpected change of motor rotation, for example, can be recognized during normal driving operations by a motor speed limitation and considered in the shifting program. This makes possible a corresponding reaction to the engine control intervention, so that the shifting procedure can be adapted to this situation.

Constant-speed driving can be detected, for example, by monitoring the speed within the scope of an advantageous embodiment of the invention. Motor vehicle acceleration is accordingly utilized as parameter during the detection of constant-speed driving.

In order to achieve an optimal basis of valuation for the detection of constant-speed driving depending on the vehicle acceleration, vehicle acceleration can be determined over a predetermined period of time in another embodiment of the invention. The period of time can be selected depending on the field of application. The sampling of the individual values of the vehicle acceleration can be applied in different ways. The values determined during acceleration monitoring are preferably stored in a memory, in particular, in a ring buffer or the like, in order to carry out the evaluation of the values determined during the considered time period. The determined acceleration values are compared during the evaluation to a threshold value by the process according to the invention. The threshold value can be made a parameter. Constant-speed driving is set in the motor vehicle, if it is determined during the evaluation that the determined acceleration values are below the predetermined threshold value.

In the detection of constant-speed driving according to the proposed process the driving speed, for example, or also another operating variable of the vehicle is determined and preferably stored, after constant-speed driving is set, within the scope of a next embodiment. It is very easy to carry out an evaluation based on the determined and stored values of driving speed, if the detection of constant-speed driving can be potentially reset. The changes in driving speed can be determined, for example, for evaluating these based on an applicable threshold value. Constant-speed driving can be reset in the case of a change in driving speed which is above this threshold value. So-called signal toggling can be prevented by means of this hysteresis.

Another advantageous variant of the invention can provide for the constant-speed driving detection on the basis of a respectively existing engine mode. Already known information can be advantageously utilized in this type of constant-speed driving detection, in order to detect constant-speed driving and set the latter in the shift program.

The information about the current mode of the engine can be preferably obtained via a communication connection with the engine control device. Other means of communication can also be utilized. It has been shown, however, to be particularly advantageous to retrieve the information about the respectively current mode via the control device, since the information is stored in the engine control device.

A constant-speed driving can be set in the shift program, if an external speed regulation is provided, for example, as mode of the engine, and this mode information is transmitted by means of a corresponding signal. The external speed regulation of the engine is present when a driving speed limiter or a maximum speed limiter is active. Other operating conditions can also be present, however, which provide speed regulation of the driving speed.

A further development of the invention can provide that the constant-speed driving is reset when the driving speed limiter is not active, if the maximum speed limiter is not active, and if the shift program is not active. The shift program must be taken into consideration here, since the mode changes with a gear shift, even though an externally induced speed regulation of the driving speed can be active.

Any desired combination of possibilities of the embodiment variants of the inventive process can be utilized in the process according to the invention. It can be provided in the process, for example, that exclusively the acceleration monitoring or exclusively the mode monitoring is utilized to set the constant-speed driving or reset the constant-speed driving. It is also possible for both processes to be carried out in parallel to each other and for one of the two processes to be sufficient to set or reset the constant-speed driving.

BRIEF DESCRIPTION OF THE DRAWINGS

The invention will be explained in greater detail below using the figures.

Shown are.

DETAILED DESCRIPTION OF THE PREFERRED EMBODIMENTS

Figure 1:
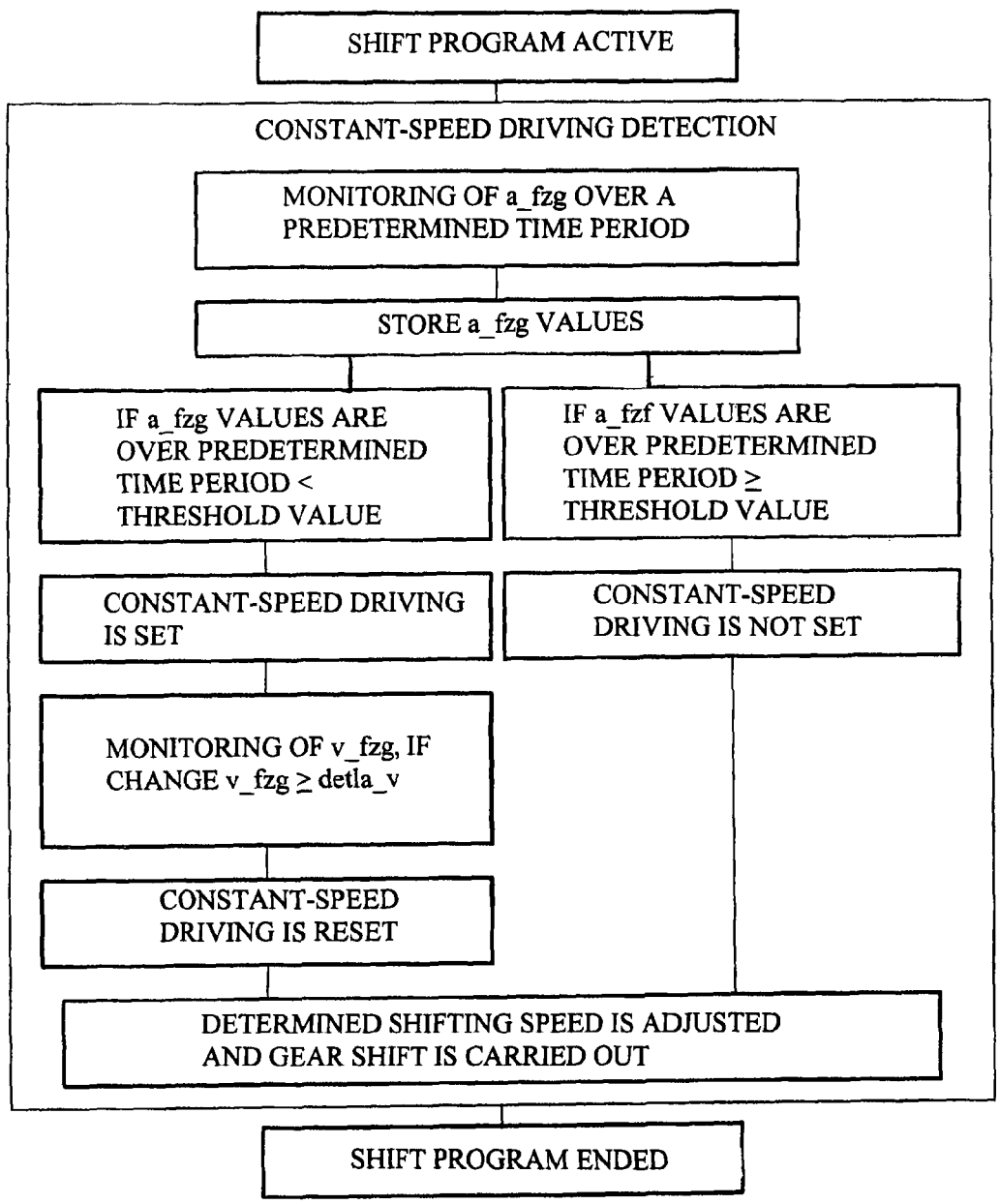
FIG. 1: shows a flow diagram of a possible variant of a process according to the invention.

In the embodiment of the process according to the invention shown in FIG. 1, detecting constant-speed driving is undertaken within the shift program, via monitoring the vehicle acceleration a_fzg. The vehicle acceleration a_fzg is monitored for this purpose over a defined, predetermined time period, and all of the values of the vehicle acceleration a_fzg are stored, for example, in a ring buffer.

Constant-speed driving is set in the shift program if the stored values of the vehicle acceleration a_fzg are below a parametrizable threshold value, that is, all of the ring buffer values are within the predetermined tolerance range. Constant-speed driving is not set if the stored values of the vehicle acceleration a_fzg are greater than the predetermined threshold value or are no longer within the tolerance range. In this case, the shift program is carried out normally, so that the gear shift is carried out when a shifting speed determined by means of the shift program is reached, and the shift program is thereafter, for example, completed or ended.

If, however, constant-speed driving is set, the driving speed v_fzg can be monitored and stored, if required, so that constant-speed driving can be reset, when a change of the driving speed v_fzg by an applicable threshold value delta_v occurs. After constant-speed driving is reset, the determined shifting speed can be adjusted in the usual way, in order to carry out the gear shift and end the shift program.

Figure 2:
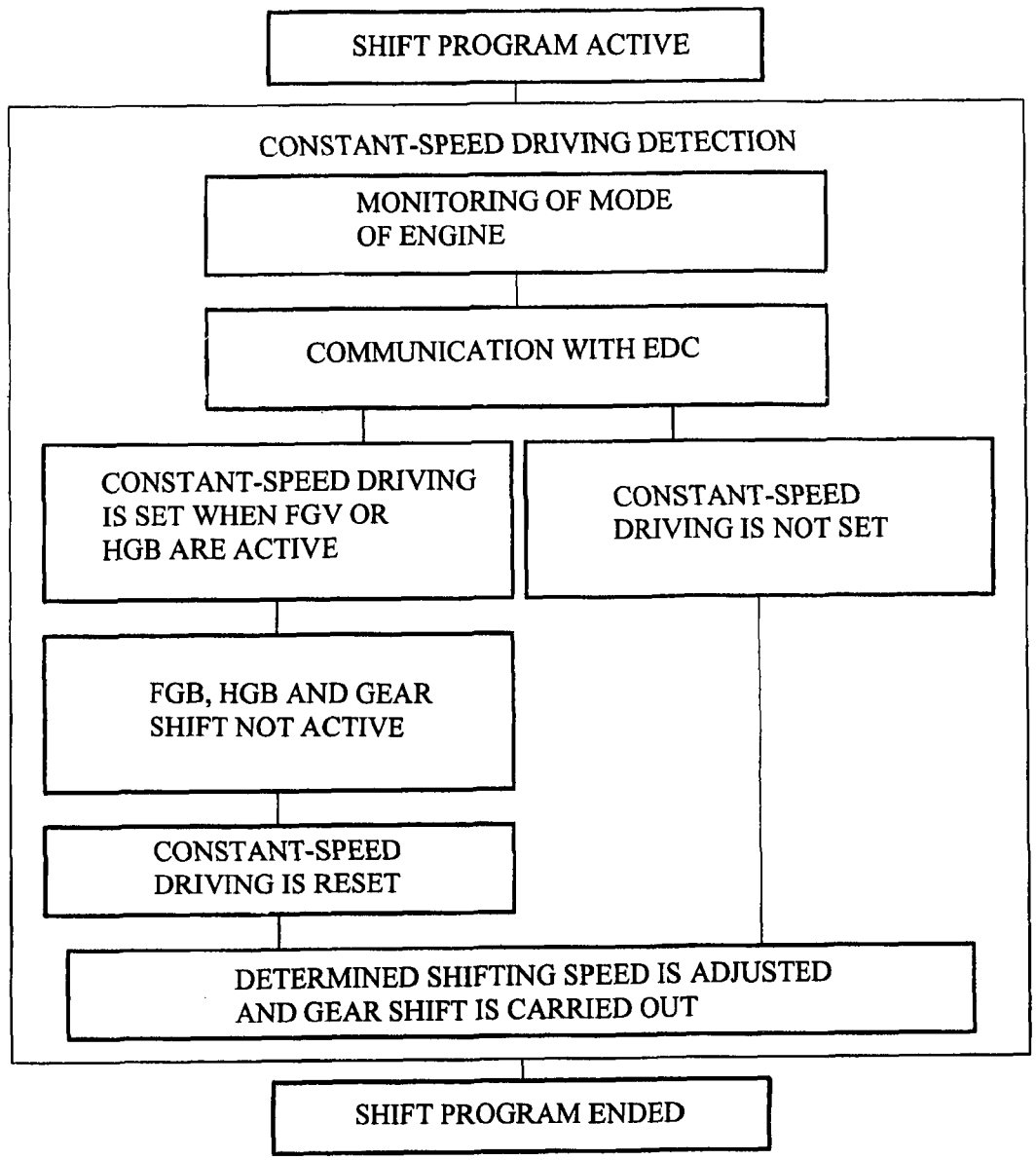
FIG. 2: shows a flow diagram of a second variant of the process according to the invention.

FIG. 2 shows a second embodiment of the process according to the invention. In this variant, the detection of constant-speed driving is carried out on the basis of the evaluation of a mode of the engine. For this purpose, the actual current mode, in which the engine is at that particular time, is retrieved in the active shift program via the communication connection with the engine control device EDC.

If the engine is, for example, in an external speed regulation, this is transmitted to the shift program via the engine control device EDC on the basis of a corresponding signal. In this case, constant-speed driving is detected and accordingly set in the vehicle. The external engine speed regulation is utilized as setting condition in this embodiment variant of the invention. The external engine speed regulation is present, when a driving speed limiter FGB or a maximum speed limiter HGB is active.

The shift program normally comes to an end when this external engine speed regulation is carried out in the vehicle. In this case, constant-speed driving is not set and the determined shifting speed is adjusted in order to carry out the gear shift.

If, however, constant-speed driving is set, the reset conditions must be checked. As soon as this is fulfilled, constant-speed driving is reset, so that the shift program can then adjust the determined engine speed, and the gear shift can be carried out in order to end the shift program. The reset conditions of constant-speed driving are present when neither the driving speed limiter FGB nor the maximum speed limiter HGB nor a gear shift is active.

REFERENCE CHARACTERS a_fzg Vehicle acceleration
delta_v Threshold value
EDC Engine control device
v_fzg Driving speed

The invention claimed is:

1. A method of controlling and regulating an automatic transmission of a motor vehicle during which a predetermined shifting speed, at which a gear shift is carried out, is adjusted during a shift program, the method comprising:
   detecting constant-speed driving of the vehicle at least during the shift program,
   detecting unexpected engine control intervention during normal driving operation,
   considering the unexpected engine control intervention in the shift program; and
   monitoring vehicle acceleration (a_fzg) and a respective current engine mode of the vehicle in parallel and either setting or resetting a constant-speed driving with consideration respectively given to either a value of the vehicle acceleration (a_fzg) or current engine mode of the vehicle.

2. The method according to claim 1, further comprising adjusting a determined shifting speed by the shift program after constant-speed driving is reset,
   carrying out the gear shift, and
   ending the shift program.

3. The method according to claim 1, further comprising considering vehicle acceleration (a_fzg) to detect and either set or reset constant-speed driving.

4. The method according to claim 3, further comprising determining the vehicle acceleration (a_fzg) over a predetermined period of time.

5. The method according to claim 4, further comprising storing determined values of the vehicle acceleration (a_fzg) in a ring buffer.

6. The method according to claim 4, further comprising comparing the determined values of the vehicle acceleration (a_fzg) to a threshold value.

7. The method according to claim 6, further comprising adjusting a constant-speed driving of the vehicle when the determined values of the vehicle acceleration (a_fzg) are below the threshold value.

8. The method according to claim 1, further comprising, after the detection of constant-speed driving, determining and storing a driving speed (v_fzg).

9. The method according to claim 8, further comprising, when the driving speed (v_fzg) changes by a predetermined threshold value (delta_v), resetting the constant-speed driving.

10. The method according to claim 1, further comprising considering a respective current engine mode of the vehicle to detect and either set or reset constant-speed driving.

11. The method according to claim 10, further comprising determining a respective current engine mode of the vehicle via communication with an engine control device (EDC).

12. The method according to claim 10, further comprising setting a constant-speed driving when the driving speed (v_fzg) is regulated externally.

13. The method according to claim 12, further comprising ascertaining that the driving speed (v_fzg) is regulated externally and setting a constant-speed driving when either a driving speed limiter (FGB) or a maximum speed limiter (HGB) is active.

14. The method according to claim 10, further comprising ascertaining that constant-speed driving is reset when a driving speed limiter (FGB), a maximum speed limiter (HGB) and the shift program are inactive.

* * * * *